United States Patent
Wang

(10) Patent No.: US 6,516,685 B2
(45) Date of Patent: Feb. 11, 2003

(54) POWER-SAVING DRIVING DEVICE FOR TREADING PEDALS OF BICYCLE

(76) Inventor: Kai-Ping Wang, Room No.403, 4F, No.2, Sec. 3, Chung Ching S. Rd., Taipei (TW)

(*) Notice: Subject to any disclaimer, the term of this patent is extended or adjusted under 35 U.S.C. 154(b) by 0 days.

(21) Appl. No.: 09/797,583

(22) Filed: Mar. 5, 2001

(65) Prior Publication Data

US 2002/0152836 A1 Oct. 24, 2002

(51) Int. Cl.$^7$ ............................. G05G 1/14; F16H 1/06
(52) U.S. Cl. ..................... 74/594.2; 74/413; 280/261
(58) Field of Search ........................... 74/594.2, 414, 74/413, 63; 474/144; 180/206; 280/260, 261, 236

(56) References Cited

U.S. PATENT DOCUMENTS

| | | | | |
|---|---|---|---|---|
| 355,375 A | * | 1/1887 | Brown | 280/260 |
| 619,421 A | * | 2/1899 | Johnson | 280/260 |
| 628,839 A | * | 7/1899 | Newsom | 280/238 |
| 2,486,858 A | * | 11/1949 | May | 30/15 |
| 4,261,223 A | * | 4/1981 | Johnson | 74/393 |
| 4,816,009 A | * | 3/1989 | Philipp | 280/236 |
| 4,962,925 A | * | 10/1990 | Chang | 482/59 |
| 5,020,792 A | * | 6/1991 | Chen | 482/127 |
| 5,215,323 A | * | 6/1993 | Cowan | 280/236 |
| 5,228,710 A | * | 7/1993 | Lu | 280/259 |
| 5,397,142 A | * | 3/1995 | Schwarzenbacher | 280/259 |
| 5,720,490 A | * | 2/1998 | Chang | 280/259 |
| 5,983,751 A | * | 11/1999 | DeCloux | 280/260 |
| 6,298,740 B1 | * | 10/2001 | Bridges | 74/119 |
| 6,318,198 B1 | * | 11/2001 | Gordon | 74/341 |

FOREIGN PATENT DOCUMENTS

| | | | |
|---|---|---|---|
| JP | 5617808 A | * | 2/1981 |
| JP | 59205056 A | * | 11/1984 |
| JP | 1150059 A | * | 6/1989 |
| JP | 1269688 A | * | 10/1989 |
| JP | 314957 A | * | 1/1991 |

OTHER PUBLICATIONS

US 2002/0074768 to Huret.*

* cited by examiner

*Primary Examiner*—Jack Lavinder
*Assistant Examiner*—Melody M. Burch
(74) *Attorney, Agent, or Firm*—Rosenberg, Klein & Lee

(57) ABSTRACT

A power-saving driving device for treading the pedals of a bicycle is disclosed. Thereby, the driver may use a smaller force to tread a bicycle so that a higher efficiency is provided. The power-saving device comprises two crank axles. The two crank axles are fixed to a gear box. Two spur gears are engaged to the gear box, and two free wheels are installed at an exterior of the gear box. The two spur gears and two free wheels are connected to the two crank axles. The two free wheels are connected through a chain; and a chain wheel and a bearing are connected to the crank axles. Thereby, the forces from the right and left legs can be outputted effectively. The driving of a bicycle and the power necessary are improved. Therefore, the driver treads the pedals with a smaller depth and thus the physical consumption is reduced.

1 Claim, 9 Drawing Sheets

POWER-SAVING DRIVING DEVICE FOR TREADING PEDALS OF BICYCLE

FIELD OF THE INVENTION

The present invention relates to a power-saving driving device for treading the pedals of a bicycle, wherein the driving of a bicycle and the power necessary are improved. Therefore, the driver treads the pedals with a smaller depth and thus the physical consumption is reduced.

BACKGROUND OF THE INVENTION

Because the progress in the human life, many people are habitual in the leisure life so that the exercises are reduced. People waste much time in the offices or home. However, exercise is beneficial to the health of human body, and riding a bicycle is a convenient exercise, which can be executed when going to office or home, or along a short path. Furthermore, riding bicycle can be a way of enjoying a leisure life. More and more peoples ride bicycles to replace other traffic tools for the shake of convenience or exercise.

However, in general, a large force is necessary to tread a bicycle, especially, going upwards along a slope. It is because the prior art driving device of a bicycle is not effective both in assembly and application. Therefore, it is necessary to improve such defect.

SUMMARY OF THE INVENTION

Accordingly, the primary object of the present invention is to provide a power-saving driving device for treading the pedals of a bicycle, wherein the driving of a bicycle and the power necessary are improved. The rider can has a large riding range of large traveling angle by applying a larger torque. Therefore, the driver treads the pedals with a smaller depth and thus the physical consumption is reduced.

Another object of the present invention is to provide a power-saving driving device for treading the pedals of a bicycle, wherein the driving of a bicycle and the power necessary are improved so that the energy required is saved, air pollution is reduced and the exercising of body is achieved.

To achieve the objects, the present invention provides a power-saving driving device comprising two crank axles. The two crank axles are fixed to a gear box. Two spur gears are engaged in the interior of the gear box, and two free wheels are installed at an exterior of the gear box. The two spur gears and two free wheels are connected to the two crank axles. The two free wheels are connected through a chain; and a chain wheel and a bearing are connected to the crank axles. Thereby, the forces from the right and left legs can be outputted effectively. The driving of a bicycle and the power necessary are improved. Therefore, the driver treads the pedals with a smaller depth and thus the physical consumption is reduced.

The various objects and advantages of the present invention will be more readily understood from the following detailed description when read in conjunction with the appended drawing.

DETAILED DESCRIPTION OF THE PREFERRED EMBODIMENTS

To more understand the present invention by those skilled in the art, in the following, the details will be described with the appended drawings. However, all these descriptions are used to make one fully understand the present invention, while not to be used to confine the scope of the present invention defined in the appended claims.

Referring to FIGS. 4 to 15, a power-saving driving device for treading the pedals of a bicycle according to the present invention is illustrated. By the present invention, the driver may use less force to tread a bicycle so that a higher efficiency is provided. The power-saving driving device for treading the pedals of a bicycle according to the present invention includes a gear box (referring to FIGS. 6 and 7). Two spur gears 2 and 3 are installed within the gear box. The two spur gears 2 and 3 are engaged to two crank axles 4 and 5. Each of the crank axles 4 and 5 are connected with respective bearing 12. The two crank axles 4 and 5 and the two spur gears 2 and 3 are combined, respectively, through a wedge 13. (referring to FIG. 9).

Figure 7:
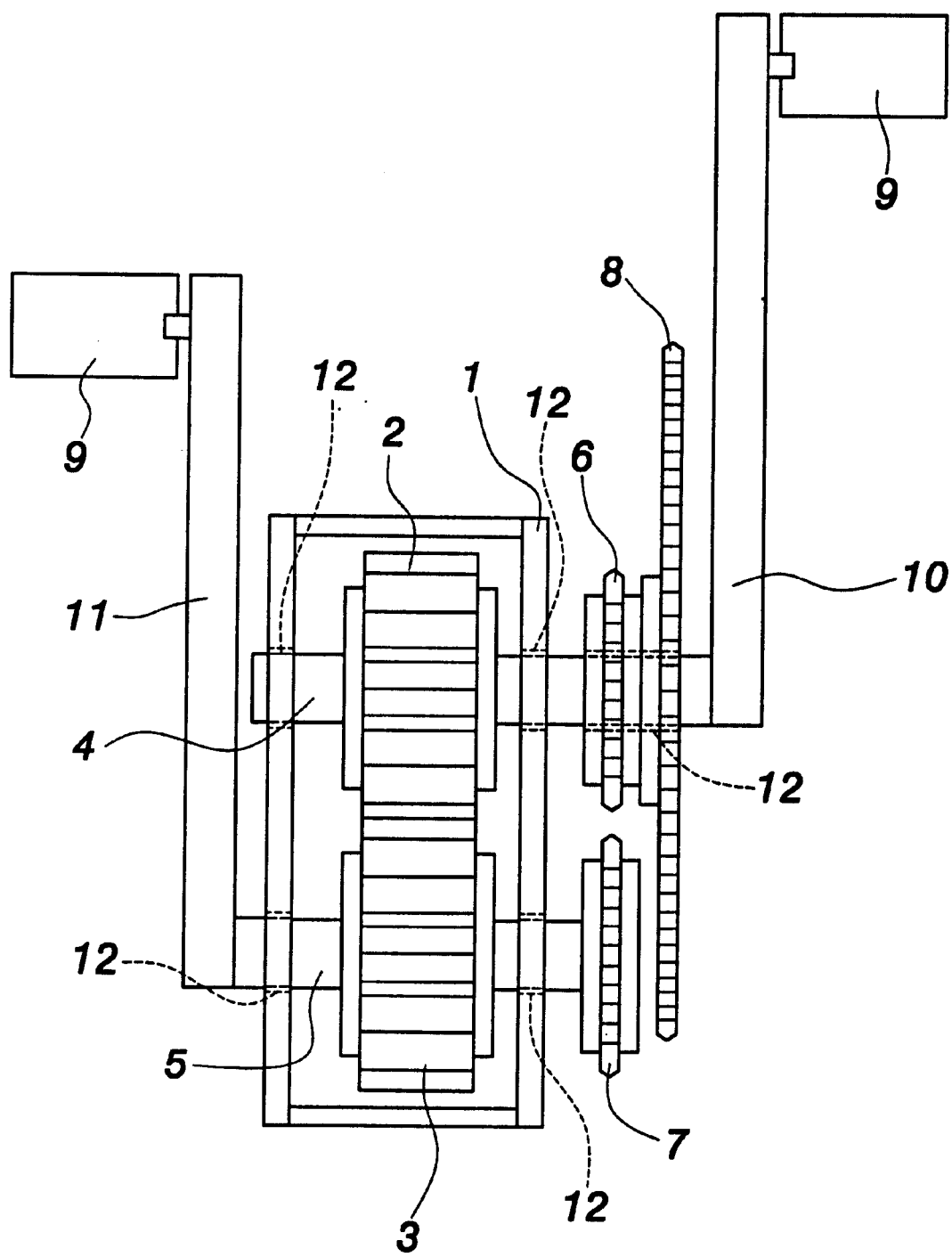
FIG. 7 is an assembled plane view of the present invention.
Figure 8:
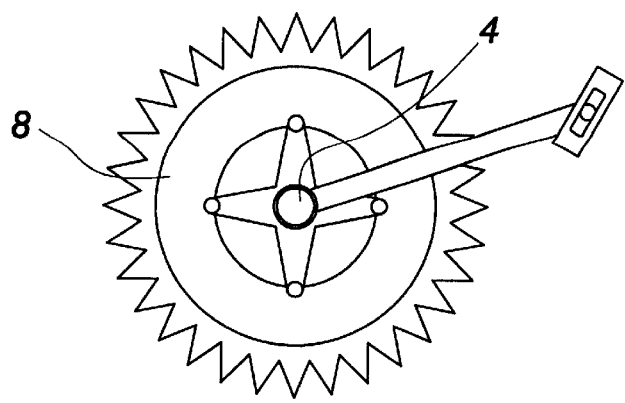
FIG. 8 is a first plane view of the components of the present invention.
Figure 9:
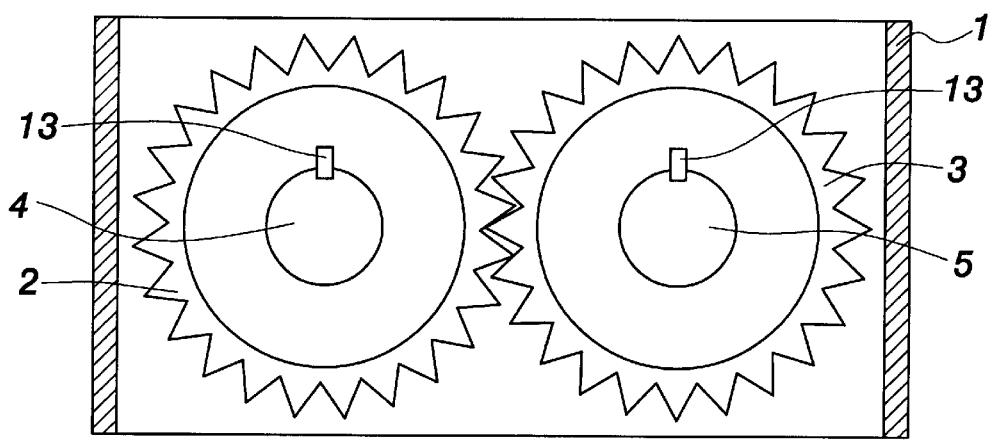
FIG. 9 is a second plane view of the components of the present invention.
Figure 10:
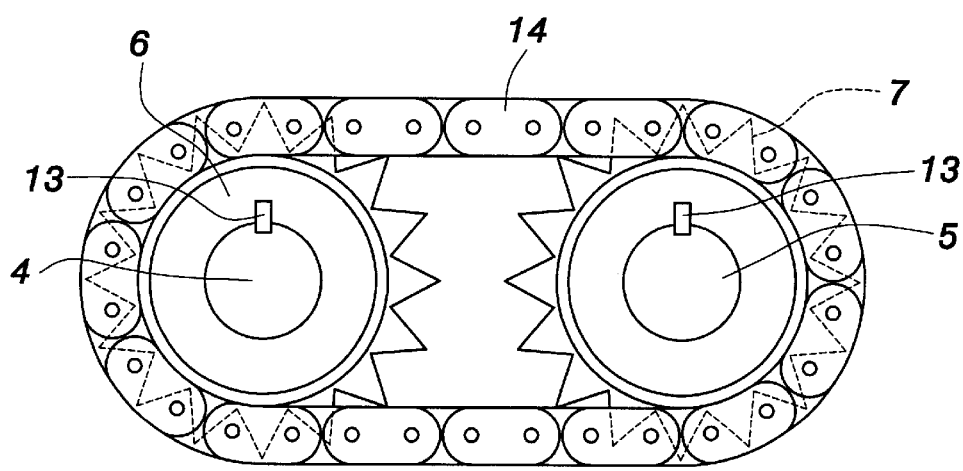
FIG. 10 is a third plane view of the components of the present invention.
Figure 11:
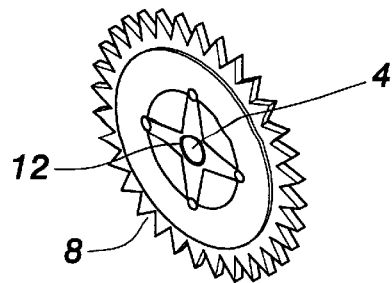
FIG. 11 is a first perspective view of the components of the present invention.
Figure 12:
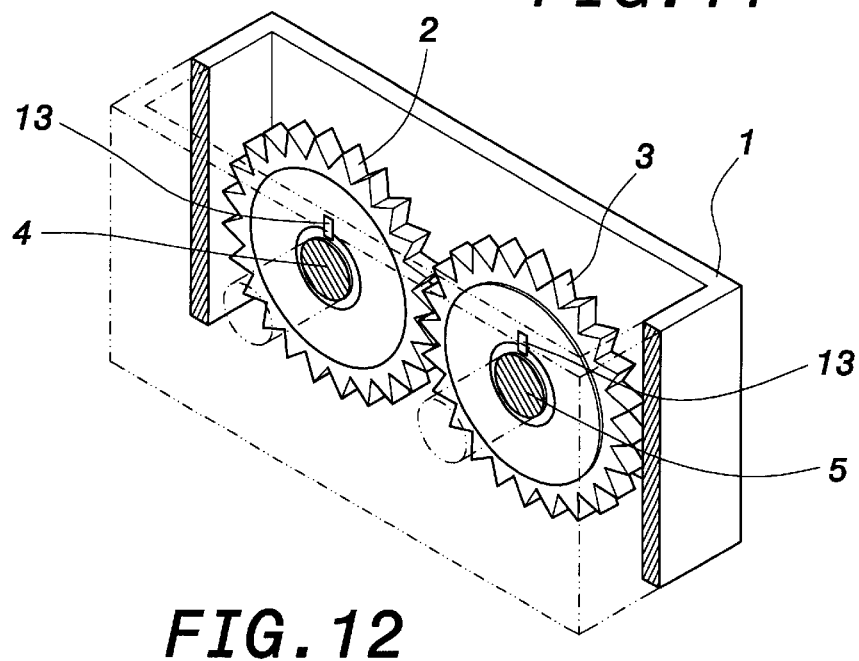
FIG. 12 is a second perspective view of the components of the present invention.
Figure 13:
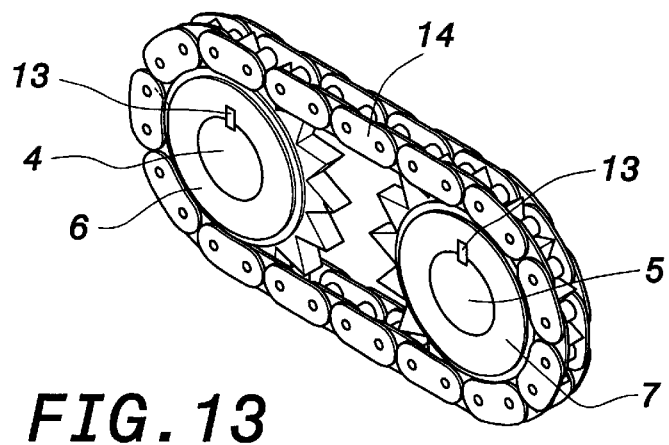
FIG. 13 is a third perspective view of the components of the present invention.

Further, two free wheels 6 and 7 are installed. Each of the free wheels 6, 7 is connected to a respective one of the crank axles 4 and 5. Then, a chain 14 is engaged upon the outer teeth of the two free wheels 6 and 7. Then, a chain wheel 8 and a bearing 12 are engaged on the crank axle 4. The lateral side of the outer edge of the free wheel 6 is fixedly combined to the adjacent lateral side of the chain wheel 8 (FIG. 7). Then, two crank axles 4 and 5 are firmly secured to a right crank arm 10 and a left crank arm 11 (referring to FIGS. 6 and 7).

Figure 14:
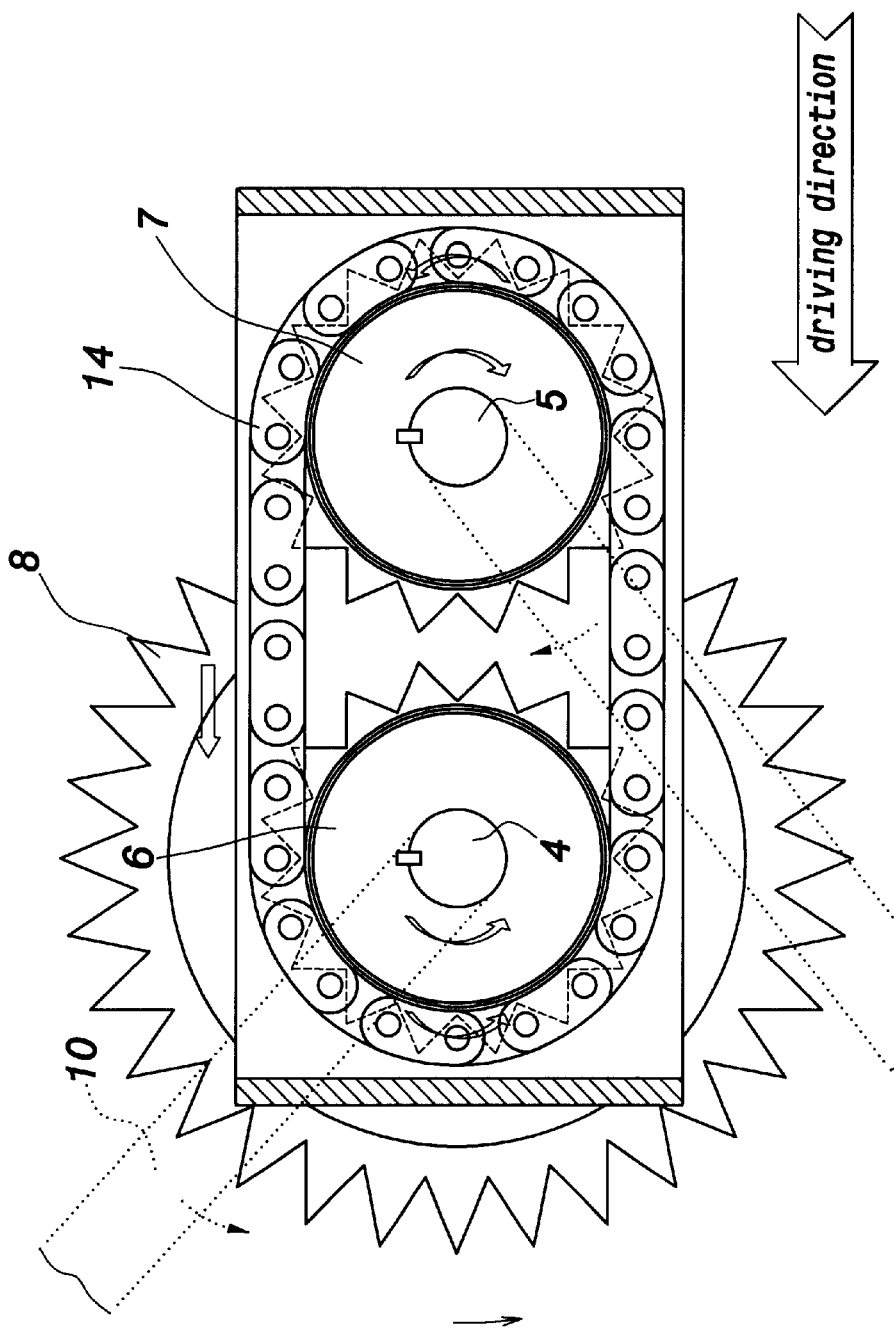
FIG. 14 shows the first driving direction of the present invention.

Further referring to FIGS. 14, when the right crank arm 10 is treaded, when the right crank arm 10 is treaded, the crank axle 4 will rotate the inner and outer sides of the free wheel 6 and meanwhile the chain 14 will rotate counterclockwise. Since the outer gear side of the free wheel 6 is combined with the adjacent side of the chain wheel 8, the chain wheel 8 will be driven to rotate counterclockwise. The chain for engaging the chain wheel 8 and the free wheel at the rear wheel (which may be a multistage speed change device) transfers the tread force of the right leg to the rear wheel so that the bicycle moves forwards. At the time that the right leg tread the pedal, since the engaged spur gears 2 and 3 fixedly connected to the crank axles 4 and 5 (see FIG. 9) so that the crank axle 5 and the crank axle 4 are rotated along opposite directions. Namely, the crank axle 5 rotates clockwise, and the inner side of the free wheel 7 still rotates clockwise, while the gear at the outer side thereof rotates counterclockwise with the chain. The inner and outer sides of the free wheel 7 rotate oppositely and idly. When the right leg treads the pedal through a proper depth, and the left leg treads the left pedal which now moves upwards.

Figure 15:
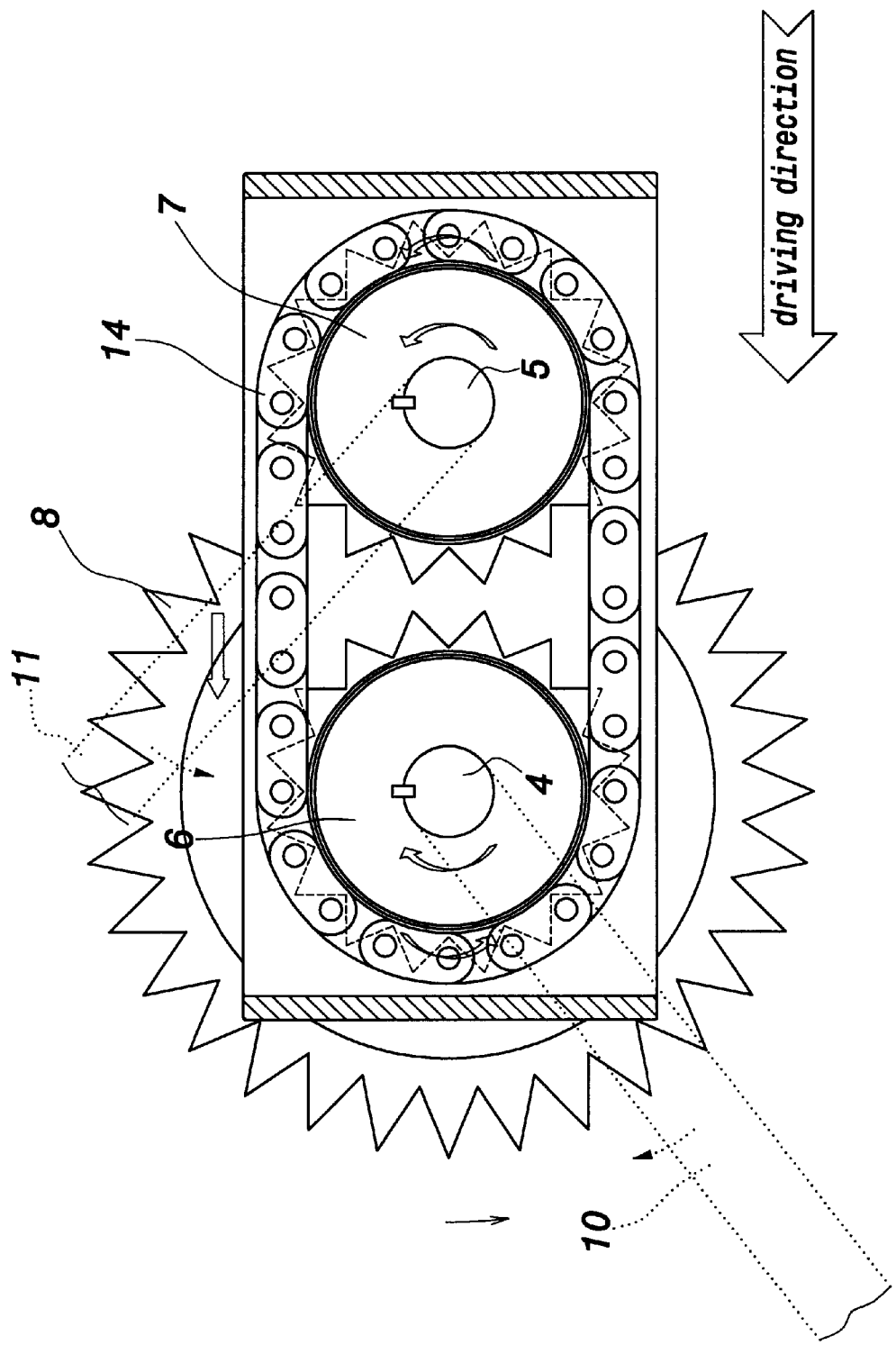
FIG. 15 shows the second driving direction of the present invention.

Referring to FIG. 15, when the left crank arm 11 is treaded, the crank axle 5 will rotate the inner and outer sides of the free wheel 7 and meanwhile the chain 14 will rotate counterclockwise. Since the outer gear side of the free wheel 6 is combined with the adjacent side of the chain wheel 8, the chain wheel 8 will be driven to rotate counterclockwise. The chain for engaging the chain wheel 8 and the free wheel at the rear wheel transfers the tread force of the left leg to the rear wheel so that the bicycle moves forwards. At the time that the left leg tread the pedal, since the engaged spur gears 2 and 3 fixedly connected to the crank axles 4 and 5 (see FIG. 9) so that the crank axle 5 and the crank axle 4 are rotated along opposite directions. Namely, the crank axle 4 rotates clockwise, and the inner side of the free wheel 6 still rotates clockwise, while the gear at the outer side thereof rotates counterclockwise with the chain. The inner and outer sides of the free wheel 6 rotate oppositely and idly. When the left leg treads the pedal through a proper depth, and the right leg treads the left pedal which now moves upwards.

Figure 1:
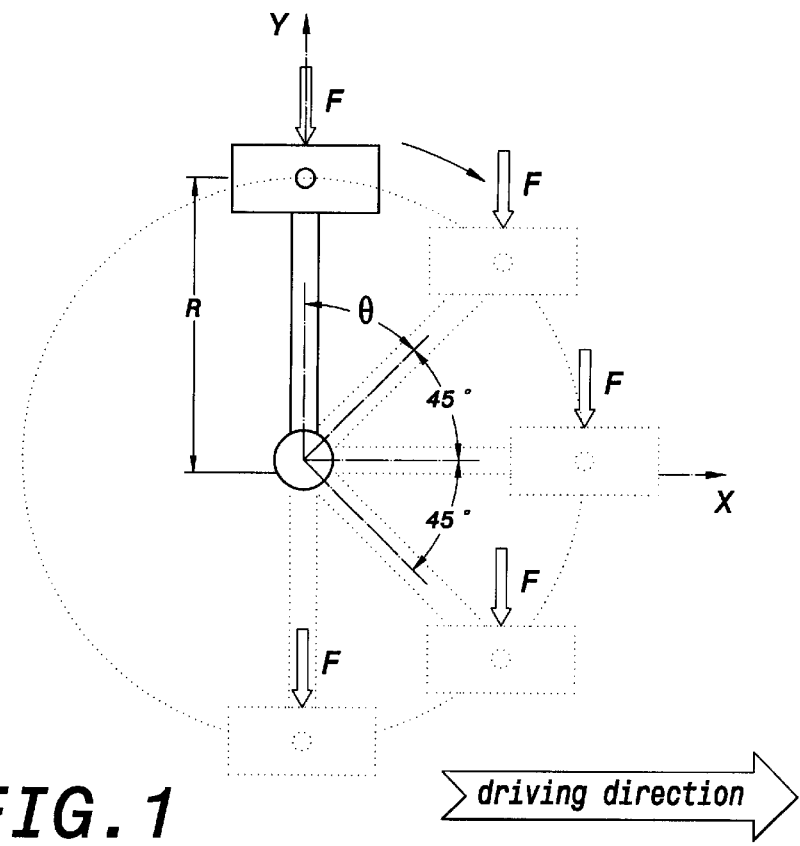
FIG. 1 is a schematic view showing the crank arm of a prior art bicycle rotating through a half period.
Figure 2:
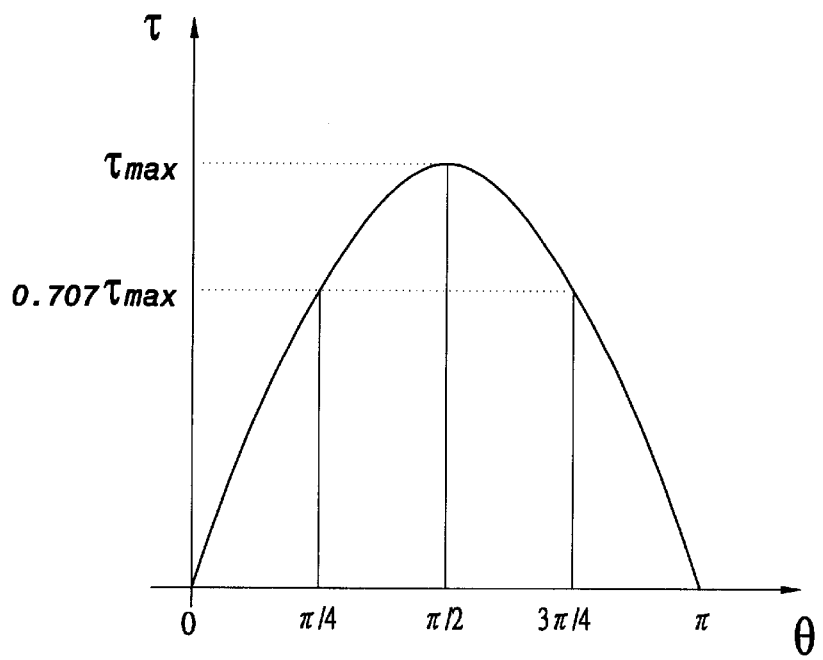
FIG. 2 is a schematic view showing the torque curve of a crank arm in the prior art bicycle along the rotation angle.
Figure 3:
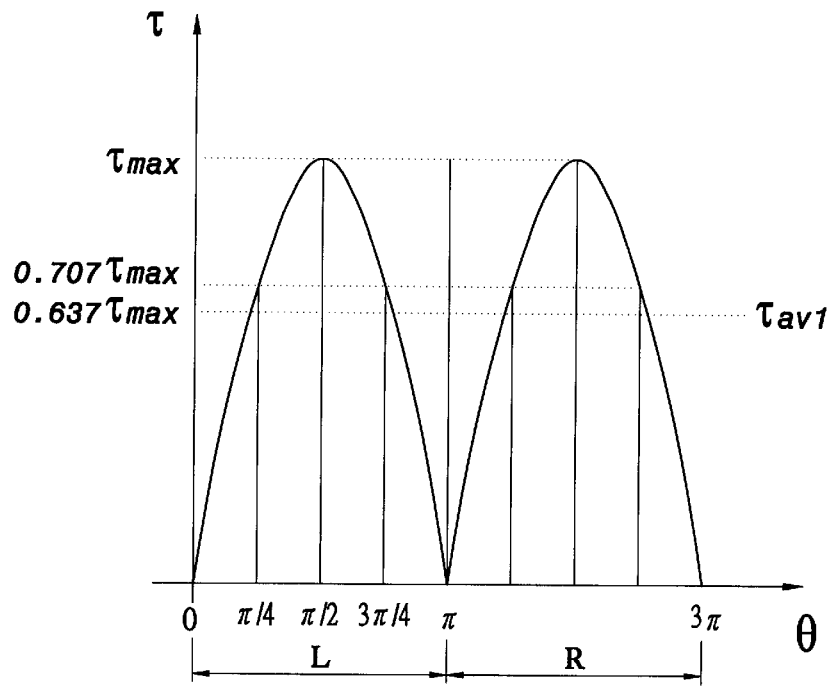
FIG. 3 is a schematic view showing the average torque curve of a crank arm in the prior art bicycle.

The physical analysis of the present invention and a prior art design will be described in the following, wherein in the analysis, the two cases have the same length for crank arms R, treading force F and angular velocity ω:

(1) Referring to FIGS. 1, 2 and 3, the average τav1 for the left or right leg to tread through one cycle of 360 degrees is:

$$\tau_{av1} = 1/2\pi \left[ \int_0^\pi FR \sin\theta\, d\theta + \int_\pi^{2\pi} FR \sin\theta\, d\theta \right]$$

$$= 0.637\, FR$$

$$= 0.637\, \tau\max (\tau\max = FR \text{ is the torque as } \theta = \pi/2)$$

Figure 5:
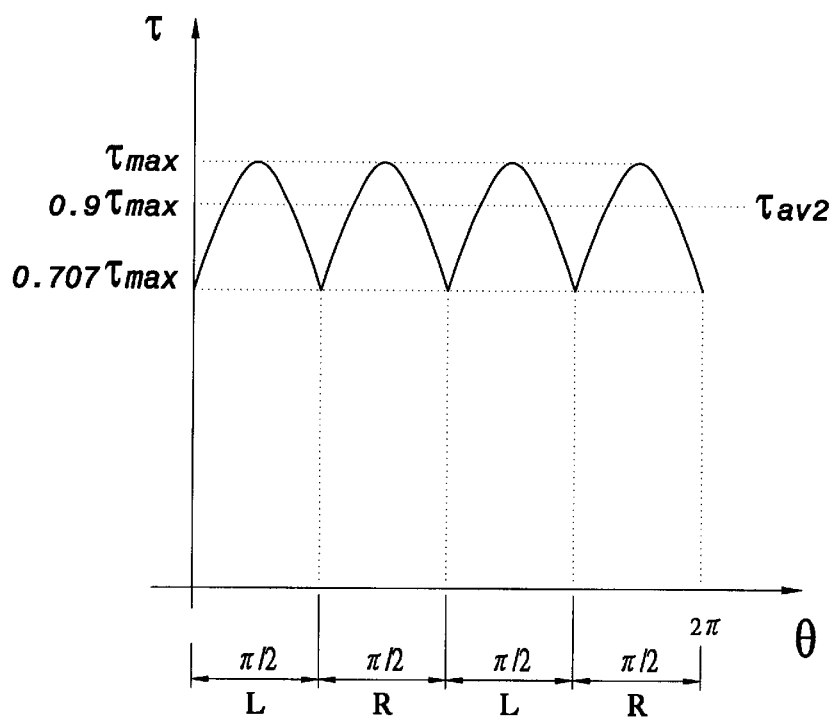
FIG. 5 is a schematic view showing the torque curve of a crank arm in the present bicycle along the rotation angle.
Figure 4:
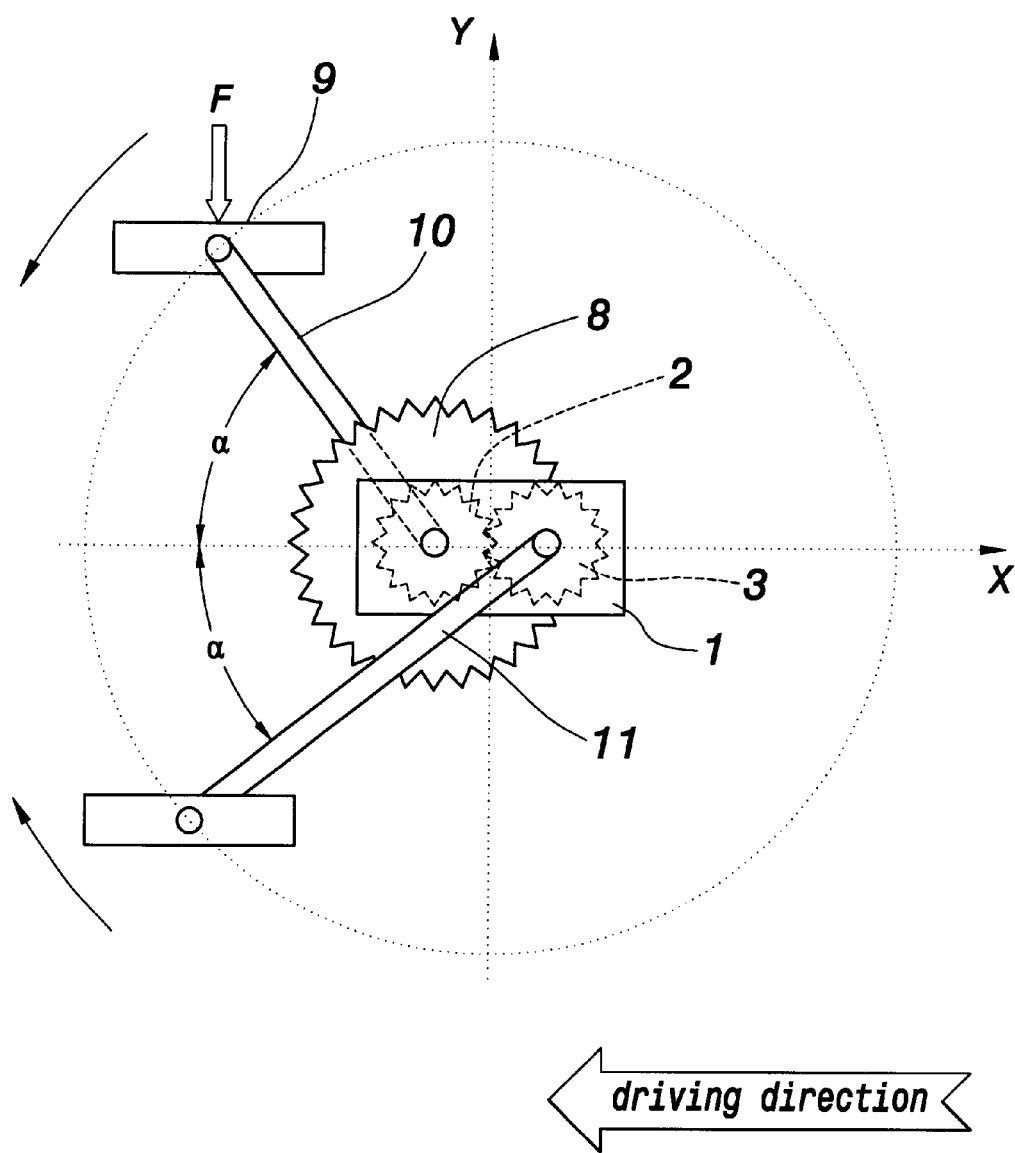
FIG. 4 is a schematic view showing the operation of the treading a crank arm according to the present invention.
Figure 6:
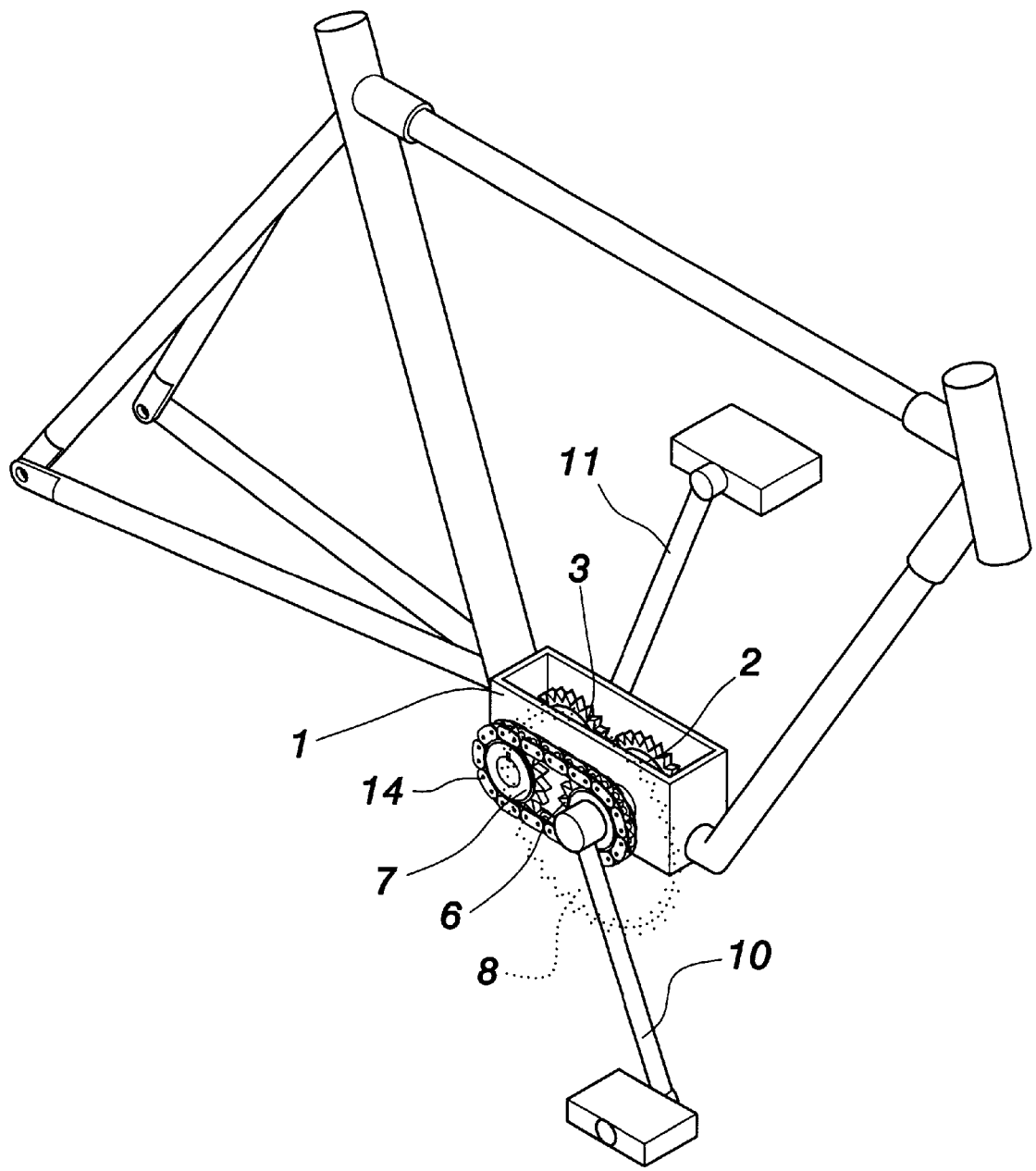
FIG. 6 shows the relative positions of the present invention.

(2) Referring to FIGS. 4 and 5, as the crank arm having an angle of ±45°, the average torque τa v 2 as treading through 360° is:

$$\tau_{av2} = 1/2\pi \left[ \int_{\pi/4}^{3/4\pi} FR \sin\theta\, d\theta \right] \times 4$$

$$= 0.9\, FR$$

$$= 0.9\, \tau\max (\tau\max = FR \text{ when } \alpha = 0)$$

(3) The ratio of the average torque in (1) and (2) is:

τa v2/τa v 1=0.9/0.637=1.413 (increasing through 41.3%)

(4) When the angular velocities of the present invention and the prior art are ω' the ratio of the average output power of (1) and (2) is:

$$P_2/P_1 = \tau_{av2\omega}/\tau_{av1\omega} = \tau_{av2}/\tau_{av1}$$

$$= 0.9/0.637 = 1.413 \text{ (with an increment of 41.3\%)}$$

(5) When the angular velocities of the present invention and the prior art are ω' the the ratio of the moving speeds of (1) and (2) is:

$$P_2/P_1 = (V_2/V_1)^2 = 1.413$$

$V_2/V_1$=1.189 (with an increment of 18.9% without concerning the air resistance)

From above description, it is appreciated that the power-saving driving device for treading the pedals of a bicycle of the present invention saves more power than the prior art design.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power-saving driving device for treading pedals of a bicycle, said power-saving driving device comprising:

(a) a gear box;

(b) a first crank axle and a second crank axle extending through said gear box in longitudinally spaced relationship, each crank axle being rotatably connected to said gear box through a respective pair of first bearings;

(c) a first spur gear and a second spur gear installed within said gear box and respectively coupled to said first and second crank axles for rotation therewith, said first and second spur gears being engaged one with the other;

(d) a first free wheel fixedly combined with a chain wheel, said first free wheel fixedly combined with said chain wheel being rotatably coupled through a second bearing to said first crank axle, said first free wheel fixedly combined with said chain wheel being disposed external to said gear box for coupling of said chain wheel to a drive chain of the bicycle;

(e) a second free wheel coupled to a first end portion of said second crank axle for rotation therewith, said second free wheel being disposed in aligned relationship with said first free wheel;

(f) a chain engaged with outer teeth of said first and second free wheels for rotating said first free wheel responsive to rotation of said second free wheel;

(g) a first crank arm coupled to said first crank axle adjacent said combined first free wheel and chain wheel for rotation with said first crank axle in a predetermined direction; and, (h) a second crank arm coupled to a second end portion of said second crank axle for rotation therewith in a direction opposite said predetermined direction.

* * * * *